Aug. 10, 1954           E. F. KELM            2,686,027
                  RESILIENTLY YIELDABLE SUPPORT
                      Filed Jan. 22, 1952
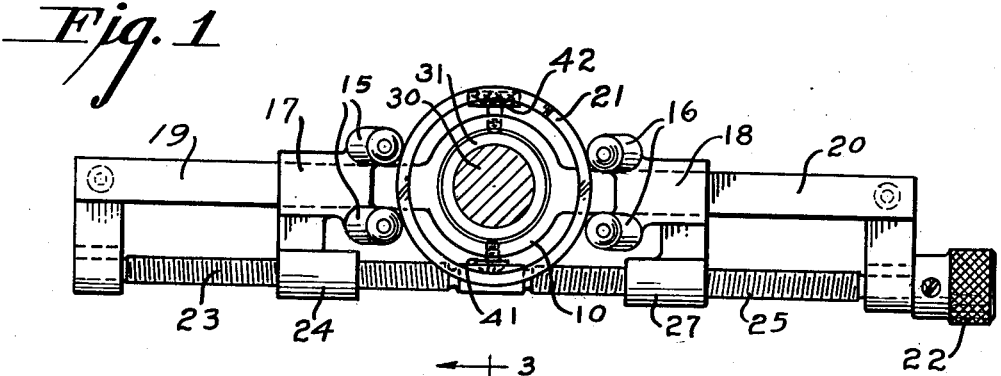
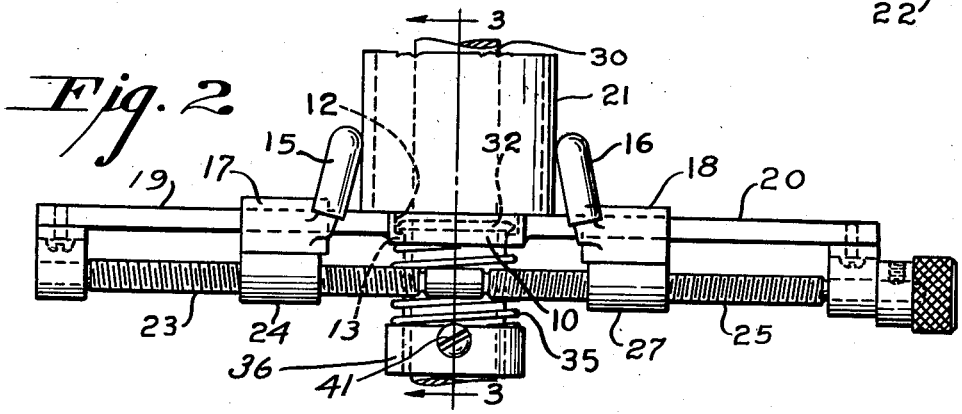
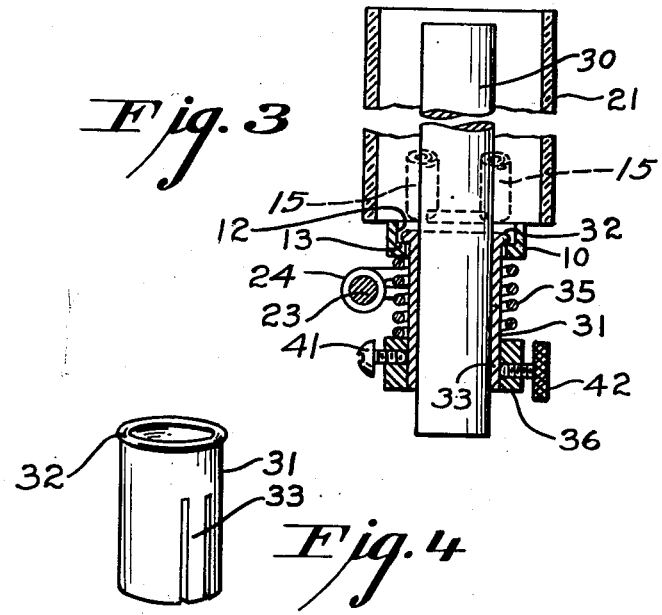
INVENTOR.
EVERETT F. KELM
BY Rolf E. Schneider
ATTORNEY.

Patented Aug. 10, 1954

2,686,027

UNITED STATES PATENT OFFICE 2,686,027

RESILIENTLY YIELDABLE SUPPORT

Everett F. Kelm, Corning, N. Y., assignor to Corning Glass Works, Corning, N. Y., a corporation of New York Application January 22, 1952, Serial No. 267,623

1 Claim. (Cl. 248—1)

The present invention relates to resilient supports for glass bodies, and has for its particular object the provision of a support for associating a rod or other element coaxially with respect to the bore of a glass tube while permitting movement of the rod relative to the tube against a resilient restraining force. Such apparatus is particularly useful in connection with supporting an internal glass-tube scorer in desired relation to a glass tube to be scored and severed.

In the accompanying drawing:

Fig. 1 is a plan view (with a part in section) of an apparatus embodying the invention with a glass tube shown associated therewith.

Fig. 2 is a side elevation of the apparatus and tube of Fig. 1.

Fig. 3 is a sectional elevation on line 3—3 of Fig. 2.

Fig. 4 is a perspective view of an element of the apparatus of Fig. 1.

Referring to the drawing in detail, the numeral 10 designates an article or tube support in the form of a crosshead having an aperture 12. Tube clamping elements 15 and 16, are respectively arranged on carriers 17 and 18 respectively slidable along opposite arms 19 and 20 of the crosshead 10. Elements 15 and 16 are conveniently advanced into and out of seizing relation with a glass tube such as 21 by means of a clamping screw 22 having a right-hand threaded section 23 passing through an internally threaded nut 24 extending from carrier 17 and having a left-hand threaded section 25 passing through an internally threaded nut 27 extending from carrier 18. As will be understood, carriers 17 and 18 are spaced like distances from the aperture 12 so that a tube clamped between elements 15 and 16 is automatically held coaxially with respect to such aperture.

Aperture 12 at one end has an inturned flange 13 through which is projected a sleeve 31 having an external flange 32, preferably of generally circular cross-sectional configuration. As will be apparent, sleeve 31 occupies aperture 12 with the inner end surface of sleeve flange 32 abutting the inner end surface of aperture flange 13. Sleeve flange 32 is resiliently held against aperture flange 13 by a partly compressed helical spring 35 which surrounds sleeve 31 in the area between a collar 36, fixed to its unflanged end by a locking screw 41, and the crosshead 10. Sleeve 31 has a bore of a diameter to freely accommodate a rod 30 adapted for coaxial insertion into tube 21 and may be fixed thereto at any position along the rod length by means of a set screw 42 threaded through collar 36 and adapted to press a tongue 33, forming a part of sleeve 31, into snug engagement with the rod 30.

As will be appreciated, the foregoing structure not only firmly engages the rod 30 but simultaneously also holds such rod in yielding and resilient relation to tube 21. Not only does spring 35 yieldingly permit limited axial movement of the rod relative to the tube, but also sleeve flange 32 serves as an annular fulcrum about any arcuate segment of which rod 30 may be pivoted at varying angles from the axis of the tube against the compressional force of spring 35, the degree of pivoting being generally limited only by the bore diameter of the tube and the distance the rod extends into the tube. As already indicated, rod 30 may be a shaft equipped at its far end with a scoring arrangement adapted for engagement with the bore wall of glass tube 21.

What is claimed is:

In a device for resiliently associating an element with respect to a tubular body, a crosshead having an aperture therethrough provided with an internal flange, associated means for clamping a tubular body to said crosshead in coaxial relation to said aperture, a tubular sleeve adapted to receive said element and occupying said flanged aperture, said sleeve having an external flange on one end thereof, the inner end surface of said sleeve flange abutting the corresponding end surface of the aperture flange, a collar fixed to the other end of said sleeve, a spring surrounding said sleeve and partly compressed between said crosshead and said collar, and means associated with said collar for clamping said sleeve to said element.

References Cited in the file of this patent

UNITED STATES PATENTS

| Number | Name | Date |
|---|---|---|
| 1,809,250 | Pendleton | June 9, 1931 |
| 2,078,453 | Miller | Apr. 27, 1937 |
| 2,558,852 | Jacobi | July 3, 1951 |